(12) United States Patent
Wojtalik et al.

(10) Patent No.: US 11,208,139 B2
(45) Date of Patent: Dec. 28, 2021

(54) STEERING COLUMN ASSEMBLY

(71) Applicant: TRW Steering Systems Poland Sp. Z.O.O., Czechowice-Dziedzice (PL)

(72) Inventors: Artur Wojtalik, Katowice (PL); Pawel Ponikiewski, Pewel Mala (PL)

(73) Assignee: ZF Steering Systems Poland Sp. z.o.o., Czechowice-Dziedzice ( * ) Notice: Subject to any disclaimer, the term of this patent is extended or adjusted under 35 U.S.C. 154(b) by 118 days.

(21) Appl. No.: 16/205,316

(22) Filed: Nov. 30, 2018

(65) Prior Publication Data

US 2019/0168798 A1 Jun. 6, 2019

(30) Foreign Application Priority Data

Dec. 1, 2017 (EP) ..................................... 17461639
Jan. 22, 2018 (GB) ..................................... 1801001

(51) Int. Cl.
*B62D 1/184* (2006.01)
*B62D 1/185* (2006.01)
*B62D 1/189* (2006.01)

(52) U.S. Cl.
CPC ............. *B62D 1/184* (2013.01); *B62D 1/185* (2013.01); *B62D 1/189* (2013.01)

(58) Field of Classification Search
CPC ........ B62D 1/184; B62D 1/185; B62D 1/187; B62D 1/189; B62D 1/181; B62D 1/18
USPC .................................... 74/493, 495; 280/755
See application file for complete search history.

(56) References Cited

U.S. PATENT DOCUMENTS

| 4,658,664 A | 4/1987 | Jacobs et al. |
| 10,449,993 B2 * | 10/2019 | Park ..................... B62D 1/189 |
| 2009/0013817 A1 | 1/2009 | Schnitzer et al. |
| 2011/0041642 A1 * | 2/2011 | Havlicek ............... B62D 1/195 |
| | | 74/493 |
| 2012/0304795 A1 | 12/2012 | Tinnin et al. |

(Continued)

FOREIGN PATENT DOCUMENTS

| CN | 202987257 U | 6/2013 |
| GB | 2415485 A | 12/2005 |

OTHER PUBLICATIONS

Extended European Search Report, Application No. 18209324.5, dated Apr. 23, 2019.

(Continued)

*Primary Examiner* — Keith J Frisby
(74) *Attorney, Agent, or Firm* — Robert James Harwood (57) ABSTRACT

An adjustable steering column assembly includes a clamp mechanism having a first rack of teeth and a second rack of teeth. A blocking device includes at least one gearwheel. At least one tooth of the blocking device is carried by the gearwheel and is engaged with the first rack of teeth when the clamp mechanism is in both the clamped position and the released position. The blocking device is disengaged from the second rack when in the released position thereby allowing the gearwheel of the blocking device to roll along the first rack of teeth during adjustment of the steering column assembly. At least one tooth of the blocking device engages the second rack of teeth when the clamp mechanism is in the clamped position. The at least one gearwheel of the blocking device in this condition is prevented from rolling along the first rack of teeth.

20 Claims, 4 Drawing Sheets

(56) References Cited

U.S. PATENT DOCUMENTS

2012/0304796 A1   12/2012   Tinnin et al.
2012/0304797 A1   12/2012   Tinnin et al.

OTHER PUBLICATIONS

Patents Act 1977: Search Report, Application No. 1801001.7, dated Jun. 19, 2018.

* cited by examiner

STEERING COLUMN ASSEMBLY

CROSS-REFERENCE TO RELATED APPLICATIONS

This application claims priority to European Patent Application No. 17461639.1, filed 1 Dec. 2017, the disclosures of which are incorporated herein by reference in entirety, and to Great Britain Patent Application No. 1801001.7, filed Jan. 22, 2018, the disclosures of which are incorporated herein by reference in entirety.

BACKGROUND TO THE INVENTION

This invention relates to steering column assemblies and in particular to a steering column assembly that can be adjusted for at least one of reach and rake.

An adjustable steering column assembly comprises a steering column shaft that connects a steering wheel of the vehicle to the steering rack, typically through a gearbox. The shaft may be a two-part telescopically adjustable shaft or may be configured to deform when subject to an axial load in a crash. The shaft is surrounded by a shroud that protects and supports the shaft. The shroud has an upper portion and a lower portion, with the upper shroud portion being movable telescopically relative to the lower portion to permit the length of the steering column assembly to be collapsed during a crash. The shroud is secured to the vehicle through a support bracket, typically fixed to a beam that extends across the width of the vehicle behind a dashboard.

Where the steering column assembly is adjustable, a clamp mechanism may be provided which secures the shroud to the mounting bracket that can be released by a driver to allow relative movement between the shroud and the bracket, and may be clamped by the driver to secure the shroud in the required position once adjustment is complete. The clamp mechanism typically secures the upper shroud portion to the bracket. This allows for a simple adjustment for reach by allowing the upper shroud to collapse onto or into the lower shroud portion, and for rake by allowing the upper portion and lower portion to move up and down together. During rake adjustment the shroud may pivot around a pivot provided on the lower shroud. This general arrangement is well known to the person skilled in the art.

In many cases, the vehicle manufacturer will specify that the reach and rake of the steering column assembly is positively secured when the clamp assembly is in the clamped position. This means that a surface-surface frictional clamping is not sufficient, and instead a positive engagement using interengaging racks of teeth must be used.

The use of interengaging racks of teeth introduces a potential problem known as tooth-on-tooth when the driver attempts to move the clamp mechanism into the clamped position and the teeth that are supposed to mesh are aligned so that the tips of the teeth on one rack contact the tips of the teeth on the other preventing the racks of teeth from fully engaging. In this condition, the positive lock is not attained and it may be impossible to move the clamp mechanism into a clamped position. Attempts to do so using excess force may even cause the teeth to become damaged.

SUMMARY OF THE INVENTION

According to a first aspect the invention provides an adjustable steering column assembly comprising: a steering column shaft that connects a steering wheel of the vehicle to the steering rack, a shroud that protects and supports the shaft comprising an upper portion and a lower portion, the upper portion being movable telescopically relative to the lower portion to permit the length of the steering column assembly to be varied, a mounting bracket through which the shroud is secured to a fixed part of the vehicle, and a clamp mechanism which secures the shroud to the mounting bracket, the clamp mechanism being operable between a released position in which at least one of the reach and rake of the steering column assembly may be adjusted and a clamped position in which the reach and rake of the steering column assembly are fixed, the clamp mechanism comprising: a first rack of teeth and a second rack of teeth that extend in parallel along opposing sides of a slot formed in a part of the steering column shroud or the mounting bracket, a blocking device comprising at least one gearwheel, the blocking device having a set of radially projecting teeth spaced around at least part of a perimeter, at least one tooth of the blocking device being carried by the gearwheel and being engaged with the first rack of teeth when the clamp mechanism is in both the clamped position and the released position, and the blocking device being disengaged from the second rack when in the released position thereby allowing the gearwheel of the blocking device to roll along the first rack of teeth during adjustment of the steering column assembly, and at least one tooth of the blocking device engaging the second rack of teeth when the clamp mechanism is in the clamped position, the at least one gearwheel of the blocking device in this condition being prevented from rolling along the first rack of teeth.

The blocking device may define a gearwheel assembly which may comprise two gearwheels interconnected by an idler gear, one gearwheel carrying the teeth that engage and roll along the first rack and the other carrying the teeth that engage the second rack. Both of the gearwheels and the idler gear may be rotatable around respective axles.

The blocking device may, in a simpler and preferred arrangement, comprise only one gearwheel which carries the plurality of teeth that engage both the first rack and the second rack.

The first and second racks may face inwardly towards each other across the slot.

The gearwheel may be supported by a clamp pin around which the gearwheel is free to rotate, the clamp pin extends through the mounting bracket and the shroud, and the clamp mechanism may include a biasing means for moving the gearwheel upon clamping in a direction parallel to the axis of the clamp pin toward and into engagement with the second rack of teeth and upon releasing in a direction away from and hence out of engagement with the second rack of teeth. The range of movement should be limited such that the teeth of the first rack always at least partially overlap and positively engage at least one tooth of the gearwheel at all times.

The biasing means may comprise a spring.

The clamp mechanism may include a user operable handle or lever that enables the driver to operate the clamp mechanism by rotating the clamp pin. Alternatively, an electric motor may be provided that is connected to the clamp pin, operation of the motor releasing or clamping the clamp mechanism.

The tips of the teeth of the first rack may each lie in a plane that is parallel to a direction of translational movement of the gearwheel when releasing or clamping of the clamp mechanism. This allows the flanks of the teeth of the toothed wheel to slide along the flanks of teeth of the first rack during clamping and releasing so they are always engaged.

The tips of the teeth of the second rack may each lie in a plane that is inclined relative to the direction of translational movement of the gearwheel when clamping or releasing. This taper permits the teeth of the gearwheel to move out of contact with the second rack as the wheel moves in a direction outward from the slot on releasing of the clamp mechanism.

The first and second racks of teeth may be linear, in that the tips of all of the teeth lie in a single plane.

The slot may be carried by the steering shroud, for example in a plate welded or riveted or otherwise fixed to the steering column shroud. The slot may be conveniently formed in the upper shroud portion.

The slot may extend in a direction that is substantially parallel to the major axis of the steering shaft so that the clamp mechanism permits adjustment of the steering column assembly for reach.

In use, with the clamp assembly unclamped the upper shroud portion may be collapsed or extended telescopically relative to the lower shroud portion, causing the gearwheel to roll along the first rack of teeth on one side of the slot whilst being held clear of the second slot of teeth. When at the desired reach position, the gearwheel is moved further into the slot so that teeth on the toothed wheel contact the teeth of the second rack of teeth. Because these teeth are inclined, the teeth of the gearwheel will either interengage between teeth of the second rack or be compressed tooth-on-tooth onto the inclined tips of the teeth of the second rack. In this positon there is no positive locking, but a slight movement of the upper shroud in a crash will cause the teeth of the gearwheel to be displaced and drop into full engagement with the second rack of teeth.

For convenience, the reach slot may be provided in a rail that extends from an upper surface of the upper shroud, allowing the clamp pin to pass across the top of the upper shroud clear of the steering shaft.

In another arrangement, the slot may be carried by the mounting bracket, for example in a plate welded or riveted or otherwise fixed to the mounting bracket. The slot may extend in a direction that is substantially orthogonal to the major axis of the steering shaft so that the clamp mechanism permits adjustment of the steering column assembly for rake. Where the shroud pivots around a pivot axis, the slot may be curved such that the circumferential centre line of the slot has a constant distance from the pivot axis.

The rake slot may be conveniently formed in the mounting bracket. In use, with the clamp assembly unclamped the upper shroud portion may be adjusted for rake, causing the toothed wheel to roll along the first rack of teeth on one side of the slot whilst being held clear of the second slot of teeth. When at the desired rake position, the toothed wheel is moved further into the slot so that teeth on the toothed wheel contact the teeth of the second rack of teeth. Because these teeth are inclined, the teeth of the toothed wheel will either interengage between teeth of the second rack or be compressed tooth-on-tooth onto the inclined tips of the teeth of the second rack. In this positon there is no positive locking, but a slight movement of the upper shroud in a crash will cause the teeth of the wheel to be displaced and drop into full engagement with the second rack of teeth.

In a further arrangement, the steering column assembly may include a third and fourth rack of teeth that extend in parallel along opposing sides of a second slot formed in a part of the steering column shroud or the mounting bracket, the second slot being substantially orthogonal to the first slot, a second gearwheel having a set of radially projecting teeth spaced around at least part of a circumference of the wheel, at least one tooth of the second gearwheel being permanently engaged with an adjacent pair of the teeth of the third rack of teeth when the clamp mechanism is in the released condition and when in the unclamped condition, no teeth of the gearwheel engaging the teeth of the fourth rack of teeth when the clamp mechanism is in the unclamped position thereby allowing the gearwheel to rotate about its axis and roll along the first rack of teeth during adjustment of the steering column assembly, and at least one tooth of the gearwheel contacting at least one tooth of the fourth rack when the clamp mechanism is in the clamped condition to prevent rotation of the toothed wheel and in turn prevent adjustment of the steering column shroud.

Of course, other arrangements of blocking device that include more than one gearwheel may be provided for engaging the third and fourth racks, such as the gearwheel with two gearwheels connected by an idler gear.

This further arrangement with two slots and two wheels permits adjustment of the steering column assembly for both reach and rake.

The two gearwheels may be carried by a common clamp pin. They may each be located within a groove on the clamp pin so they are free to rotate about their axis but cannot move axially along the clamp pin. Other arrangements for securing the wheels against axial movement along the clamp pin may be used.

The clamp mechanism may include a cam assembly carried by the clamp pin that has a length that varies as the clamp pin rotates, at least one spring that acts between the mounting bracket or shroud and the gearwheel, and an actuator which is operable to rotate the clamp pin thereby to alter the length of the cam which in turn causes the clamp pin to move axially between the released and clamped positions.

The gearwheel, or each gearwheel, may be provided with teeth that have the same pitch as the teeth of the first rack and the teeth of the second rack. The teeth may be provided around the entire circumference of the toothed wheel.

The wheel may be circular. In that case the diameter of the toothed wheel, the spacing between the two racks of teeth or the height of the teeth on the wheel may be chosen such that at all times there are two, or three or more teeth in engagement with the first rack of teeth. This ensures that any load applied to the shroud is not carried by a single tooth of the toothed wheel.

Other shapes of wheel are possible. For example the wheel may be shaped in the manner of a Rouleax polygon, the most simple of which is the three sided Rouleax triangle, a non-circular shape which also has a constant width across all diameters. The same rules concerning the diameter of the polygon relative to the width of the slot apply as for the case of a circular wheel.

Where two wheels are provided, one to control the reach and the other to control the rake, one wheel may be smaller in diameter than the other wheel. The smaller wheel may then, when the clamp mechanism in unclamped, move into the slot normally occupied by the other wheel without contacting any of the teeth of that slot.

Preferably the wheel that controls the reach position is smaller than the wheel that controls the rake position.

In a convenient arrangement, the mounting bracket may comprise an upper part from which two arms depend, the shroud being located between the two arms, each arm including a guide slot through which the clamp pin of the clamp mechanism passes.

Where the steering column assembly is adjustable for rake, a guide slot in one of the mounting arms may define the first slot that has the first rack and second rack within which a toothed wheel is engaged. If not adjustable for rake, the guide slots in the mounting arms will be sized so that the clamp pin cannot move up or down or side to side in the guide slots.

The upper part of the mounting bracket may be secured to the fixed part of the vehicle body through one or more frangible fasteners that permit the mounting bracket to break free from the vehicle body under certain crash loads.

The arms of the bracket may surround a pair of rails carried by the upper shroud, the rails each defining a slot through which the clamp pin passes. One of these slots may define the second slot that carries the third rack and fourth rack of teeth that the second toothed wheel engages.

The rail with the slot that accommodates the second wheel may be adjacent the arm of the mounting bracket that accommodates the first wheel that controls the rake of the steering column assembly.

When clamped, the arms of the mounting bracket may squeeze the rails of the shroud. This may in turn close up, at least partially, a slot provided in the upper shroud causing the upper shroud to grip the lower shroud.

Other advantages of this invention will become apparent to those skilled in the art from the following detailed description of the preferred embodiments, when read in light of the accompanying drawings.

DETAILED DESCRIPTION OF THE INVENTION

Figure 1:
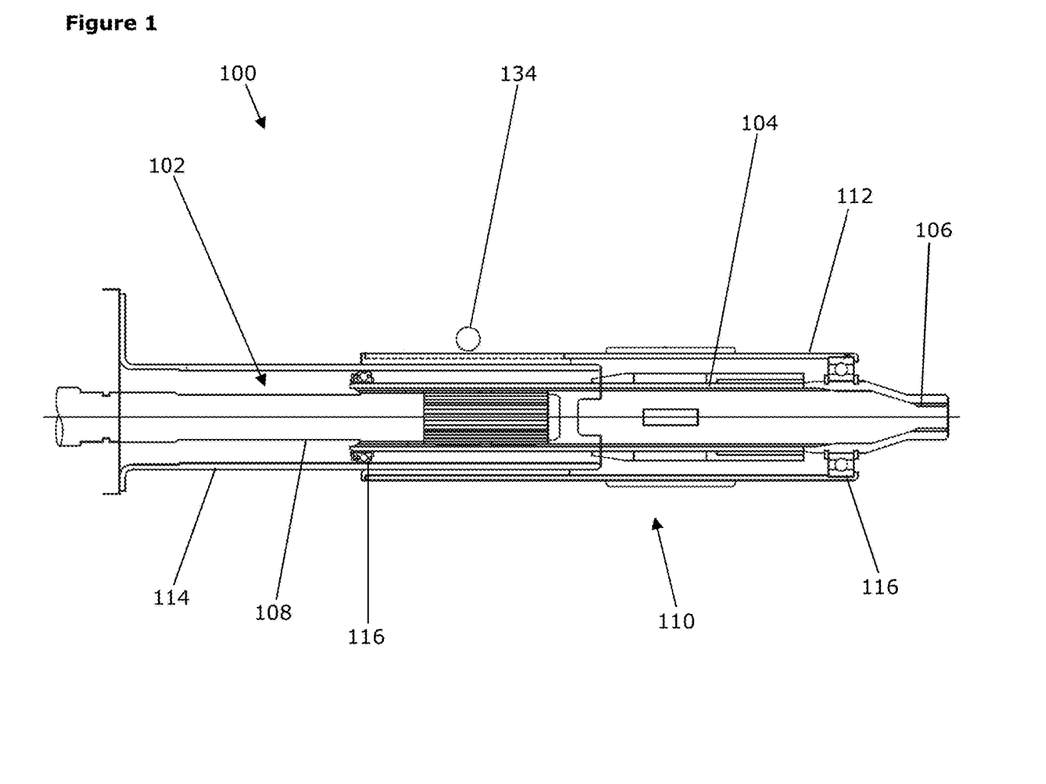
FIG. 1 is a cross-sectional side view of a steering column assembly according to the present invention.
Figure 2:
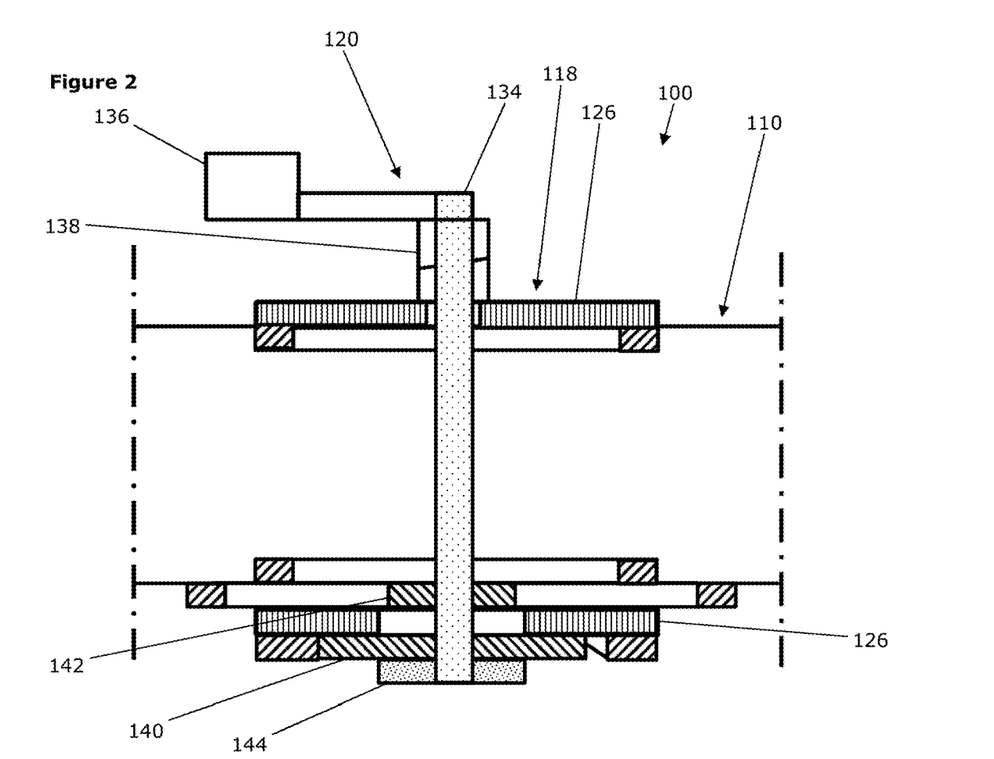
FIG. 2 is a cross-sectional plan view of the steering column assembly of FIG. 1, showing in detail the clamp mechanism.

As shown in FIG. 1, an embodiment of an adjustable steering column assembly 100 comprises a two part telescopic steering column shaft 102. An upper part 104 of the shaft 102 terminates in a splined connector 106 which enables the shaft 102 to connect to a steering wheel of the vehicle. A lower part 108 of the shaft 102 is connected to a gearbox (not shown) which is in turn connected to the steering rack of the vehicle. The gearbox may include an electric motor that enables an assistance torque to be applied to the steering column shaft 102, although this may also connect to the steering rack through a belt drive in some arrangements.

The shaft 102 is surrounded by a two part telescopic shroud 110. The shroud 110 protects and supports the steering column shaft 102, and may also carry switchgear such as indicator stalks and light controls. The shroud 110 comprises an upper portion 112 and a lower portion 114, the upper portion 112 being movable telescopically relative to the lower portion 114 to permit the length of the steering column assembly 100 to be varied. As shown the upper shroud portion 112 slides over the outside of the lower shroud portion 114. Two bearing assemblies 116 connect the steering shaft 102 to the upper and lower shroud portions 112, 114.

The steering column assembly 100 also includes a mounting bracket 118 through which the shroud 110 is secured to a fixed part of the vehicle such as a bar that extends from one side of the vehicle to the other behind the dashboard. A clamp mechanism 120 secures the shroud 110 to the mounting bracket 118.

The clamp mechanism 120 is shown in more detail in FIGS. 3 to 7. The clamp mechanism 120 is user operable between a released position in which at least one of the reach and rake of the steering column assembly 100 may be adjusted and a fixed position in which the reach and rake of the steering column assembly 100 are fixed. In the example shown in the drawings both the reach and rake may be adjusted when the clamp mechanism 120 is released.

The mounting bracket 118 has an upper part 122 that is secured to the fixed part of the vehicle body and two depending arms 124 that extend down from the upper part 122 to form an inverted U shape when the bracket 118 is viewed along the major axis of the steering column shaft 102. The two depending arms 124 surround a pair of rails 126 which extend upwards from the top of the upper shroud portion 112, the two rails 126 being spaced apart so they are located just inside a respective one of the depending arms 124. The upper shroud portion 112 is provided with an elongate slit 128 extending axially along the upper shroud 112 between the rails 126.

Each of the depending arms 124 includes a generally vertical slot 130, and each of the rails 126 includes a generally horizontal slot 132. A clamp pin 134 extends through all four slots 130, 132 from one side of the mounting bracket 118 to the other. One end of the clamp pin 134 carries a locking lever 136 and a cam mechanism 138 which is sized so that it cannot be pulled through the slot 130, and the other end of the clamp pin 134 carries a pair of toothed wheels 140, 142 and terminates in an enlarged head 144 that traps the toothed wheels 140, 142 onto the clamp pin 134. Rotation of the locking lever 136 causes the clamp pin 134 to rotate about its axis, which causes the length of the cam mechanism 138 to vary. With the lever 136 in a clamped positon the cam mechanism 138 is at its longest, and with the lever 136 in a released position the cam mechanism 138 is at its shortest.

Each toothed wheel 140, 142 defines a simple rotatable blocking device and carries a set of teeth around the circumference. A first one 140 of the toothed wheels 140, 142 is located on the clamp pin 134 between the fixed head 144 and the slot 130 in the adjacent mounting bracket 118 so that it can move in and out of the slot 130 in the mounting bracket arm 124 as the cam mechanism 138 moves between its shortest and longest lengths. A second one 142 of the toothed wheels 140, 142 is located on the inner face of the adjacent mounting bracket arm 124 so that it can move in and out of the slot 132 in the adjacent rail 126 as the cam mechanism 138 moves between its shortest and longest lengths. Springs (not shown) bias the toothed wheels 140, 142 out of their slots 130, 132 when the cam mechanism 138 is in its longest position.

The clamp mechanism 120 when in the clamped position squeezes the two toothed wheels 140, 142 into their respective slots 130, 132 which squeezes the rails 126 together and also prevents reach and rake movement of the shroud 110. The squeezing action closes up the slit 128 in the upper shroud 112, causing the upper shroud 112 to grip onto the lower shroud 114 where they overlap. When in the released position, the toothed wheels 140, 142 move out of the slots 130, 132, releasing the pressure on the rails 126 and allowing the slit 128 in the upper shroud 112 to open up to its relaxed position.

Figure 4:
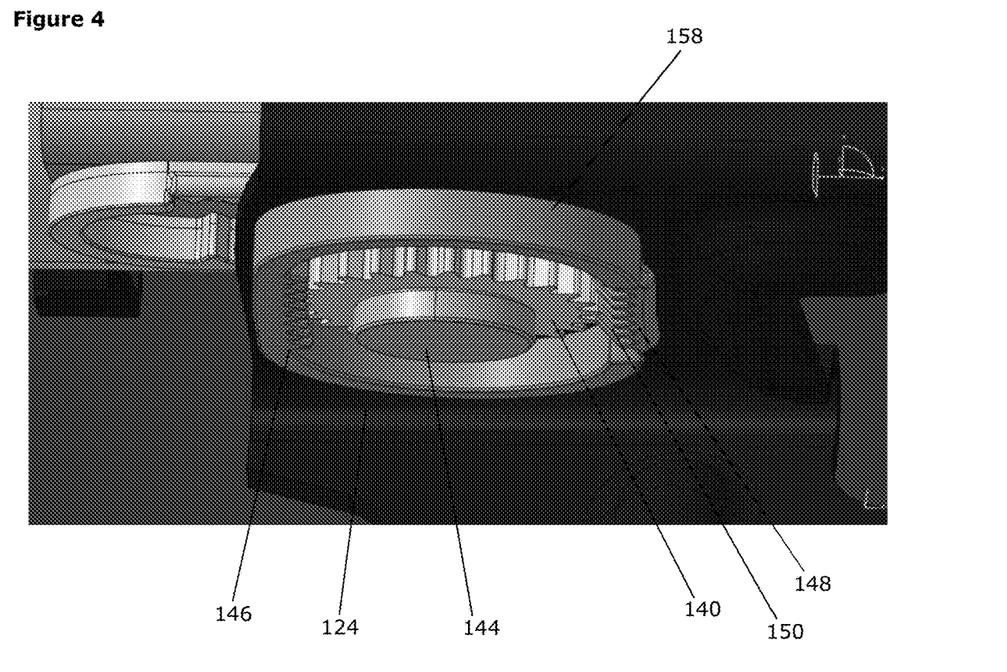
FIG. 4 is an enlarged view of the part of the clamp mechanism that controls the rake position with the clamp mechanism clamped.
Figure 5:
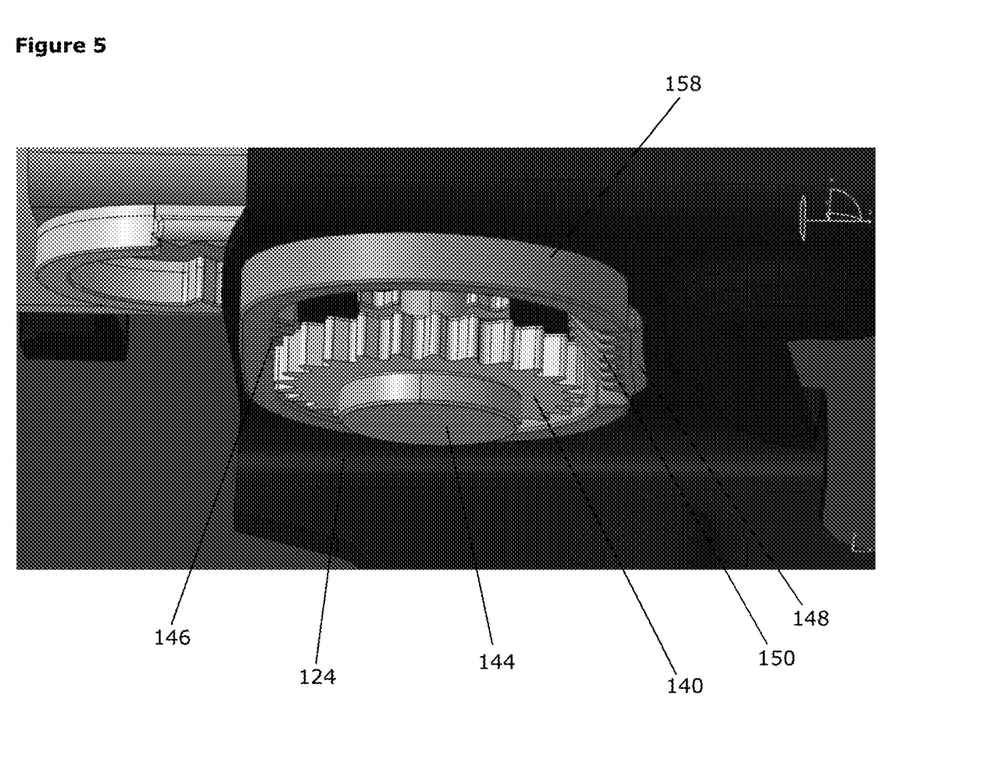
FIG. 5 is an enlarged cut away view of the part of the clamp mechanism that controls the rake position with the clamp mechanism released.

The slot 130 in the mounting bracket arm 124 into which the first toothed wheel 140 fits is best seen in FIGS. 4 and 5. This slot 130 comprises a first and second rack 146, 148 of teeth that extend in parallel along opposing sides of the slot 130. Teeth of each rack 146, 148 project from a flat surface on opposing sides of the slot 130. One of these surfaces extends at a normal to the bracket arm and the other is inclined to form a bevel 150. The normal surface is parallel to the clamp pin axis, and the tips of the teeth on that surface lie in a plane parallel to that flat surface to form a first rack 146. The bevelled surface 150 is inclined relative to the clamp pin axis, with the tips of the teeth of the second rack 148 in a plane that is parallel to that inclined surface. The tips of the second teeth of the second rack 148 therefore form ramps. These teeth form the second rack of teeth 148. These two racks 146, 148 face each other across the slot 130, with the width of the slot 130 narrowing from one face of the plate to the other. The narrow width is closest to the centre line of the steering column shroud 110.

The linear pitch of both racks 146, 148 is equal. This enables the slot 130 to accommodate the toothed wheel 140 which has a largest radius, defined as the radius of a circle containing the tips of the teeth that is wider than the narrowest part of the slot 130 but narrower than the widest part of the slot. Also, the radius of the toothed wheel 140 defined as the radius of a circle containing the roots of all the teeth of the wheel 140 is equal to or slightly larger than the narrowest part of the slot 130. The circular pitch of the teeth on the toothed wheel 140 and the linear pitch of the teeth of the two racks 146, 148 is the same.

These dimensions ensure that the first toothed wheel 140 can be pulled across into the slot 130 so that the teeth on the wheel 140 fully mesh with both racks 146, 148 but cannot be pushed right through the slot 130 and out the other side of the slot 130. It is notable that some teeth on the first toothed wheel 140 are fully engaged at all times with the teeth of the first rack 146 although when the clamp assembly 120 is in the released position they may only partially overlap as shown in FIG. 5.

The width of the slot 130 and the shape and size of the teeth are chosen so that at no time can the tips of the teeth of the wheel 140 strike the end faces of the teeth of the second rack 148. To ensure this, the ramped teeth of the second rack 148 should extend beyond the outer circumference of the toothed wheel 140.

On moving from a released positon shown in FIG. 5 to a clamped position shown in FIG. 4, the teeth of the first toothed wheel 140 may fully engage the teeth of both the first and second rack 146, 148 or fully engage only the teeth of the first rack 146.

The first situation arises in nearly all positions of the shroud 110, where the wheel 140 is aligned with the tips of the teeth of the wheel 140 offset from the tips of the teeth of the second rack 148, or more correctly the corner tip of teeth of the wheel 140, where the two flanks and tip intersect, are offset from the corresponding point flanks of the teeth of the second rack 148. In this case, the tips will strike the flanks of the teeth of the second rack 148. As these are inclined to form ramps, the teeth of the rack 148 will slide down the ramps causing a very slight rotation of the wheel 140 until the wheel is fully in the slot 130.

On the rare instances where the corner tip of the teeth of the toothed wheel 140 precisely strike the tips of the second rack of teeth 148, the wheel 140 will initially be urged into engagement with the first rack of teeth 146, with a side force being created. Once any resilience in the toothed wheel 140 and racks 146, 148 is taken up, the toothed wheel 140 will be prevented from entering further down into the slot 130 and may be considered fully clamped. As well as a positive lock to the first teeth 146, there will be a frictional engagement between the tips of the teeth of the wheel 140 and the tips of the teeth of the second rack 148.

Figure 6:
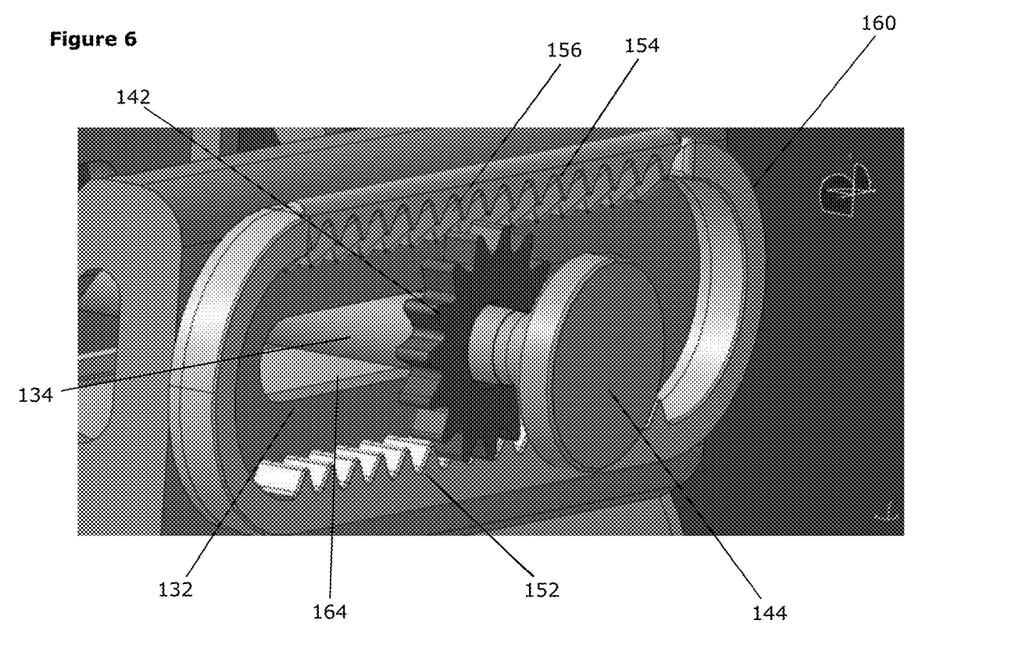
FIG. 6 is an enlarged cut away view of the part of the clamp mechanism that controls the reach position with the clamp mechanism released.
Figure 7:
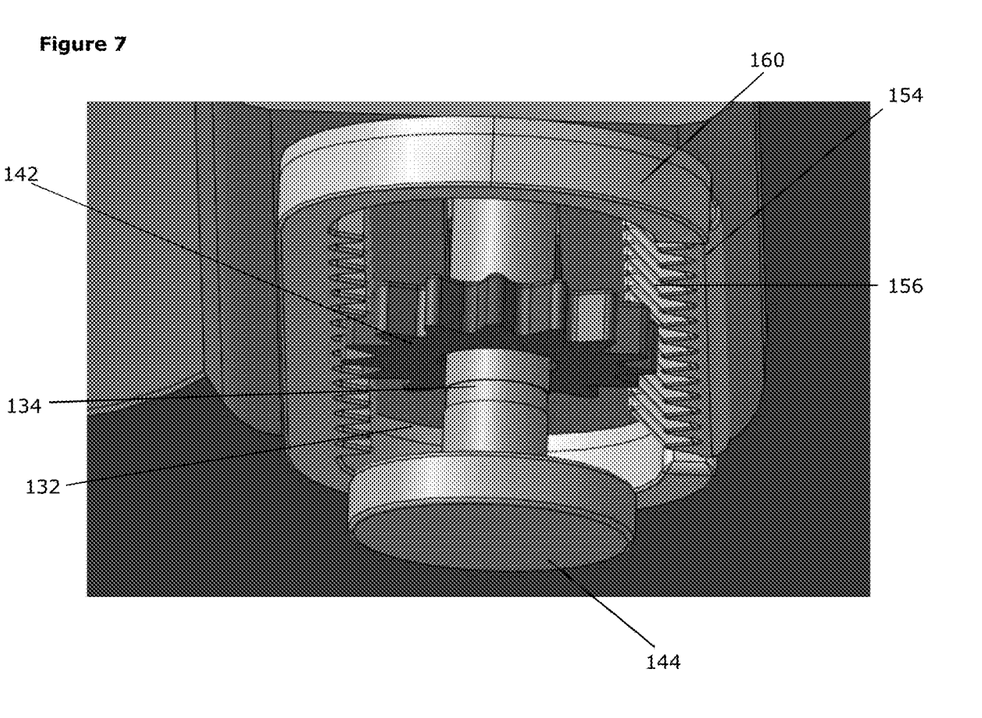
FIG. 7 is an enlarged view of the part of the clamp mechanism that controls the reach position with the clamp mechanism clamped.

FIGS. 6 and 7 best show the second toothed wheel 142 and the corresponding slot 132 in the rail 126. The second toothed wheel 142 is similar to the first 140, but in this example has a smaller diameter than the first toothed wheel 140 so that it can move partially into the slot 130 in the mounting bracket 118 when the clamp mechanism 120 is unclamped without contacting the teeth of the first rack 146 or second rack 148. Also the slot 132 in the rail 126 is similar to the slot 130 in the mounting bracket 118 and may also be identical apart from being narrower to suit the smaller second wheel 142. The slot 132 defines a third rack of teeth 152 and a fourth rack of teeth 154 that face each other across the slot 132. Teeth of each rack 152, 154 project from a flat surface on opposing sides of the slot 132. One of these surfaces for the third rack 152 extends at a normal to the bracket arm 124 and the other is inclined to form a bevel 156. The normal surface is parallel to the clamp pin axis, and the tips of the teeth on that surface lie in a plane parallel to that flat surface to form a third rack 152. The bevelled surface 156 is inclined relative to the clamp pin axis, with the tips of the teeth of the fourth rack 154 in a plane that is parallel to that inclined surface. The tips of the teeth of the fourth rack 154 therefore form ramps. The width of the slot 132 therefore narrows from the face of the rail 126 that faces the adjacent mounting bracket arm 124 to the face that faces away from the adjacent mounting bracket arm 124. The narrow width is closest to the centre line of the steering column shroud 110.

The size and shape of the slot 132 in the rail 126 enables the slot 132 to accommodate the second toothed wheel 142 which has a largest radius, defined as the radius of a circle containing the tips of the teeth, that is wider than the narrowest part of the slot but narrower than the widest part of the slot. Also, the radius of the second toothed wheel 142 defined as the radius of a circle containing the roots of all the teeth of the wheel 142 is equal to or slightly larger than the narrowest part of the slot 132. The circular pitch of the teeth on the toothed wheel 142 and the linear pitch of the teeth of the two racks 152, 154 is the same.

These dimensions ensure that the second toothed wheel 142 can be pulled across into the slot 132 so that the teeth on the wheel 142 fully mesh with both racks 152, 154 but cannot be pushed right through the slot 132 and out the other side of the slot 132. As with the first toothed wheel 140, it is notable that some teeth on the second toothed wheel 142 are fully engaged at all times with the teeth of the third rack 152 although when the clamp assembly 120 is released they may only partially overlap.

As shown in FIGS. 3 to 7, the sides of the slots 130, 132 into which the wheels 140, 142 engage may be surrounded by a metal plate 158, 160 which defines the teeth. This allows the gauge of material used to form the mounting bracket arm 124 and rail 126 to be relatively low, whilst the depth of the teeth may be relatively higher. Note that the overall thickness of the teeth on each side of the slot may be the same, so that technically the toothed wheel is always at least partially within the slot at all times.

The steering column assembly 100 of the embodiment has an advantage that there is no tooth on tooth condition that may otherwise prevent a positive lock being achieved. The teeth of the toothed wheels 140, 142 always engage one rack in the slot fully, as shown with at least two teeth, and the teeth also engage the other inclined rack fully or if engaged with the tips of the teeth will drop into full engagement with only a very small reach or rake movement of the steering column shroud. Even then there will be a frictional engagement between at least two teeth of the toothed wheels and the tips of teeth of the inclined rack.

When adjusting for reach or rake, the clamp mechanism 120 is released and the toothed wheels 140, 142 move partially out of the slots as shown in FIGS. 5 and 6. This leaves the toothed wheels 140, 142 only engaging one rack in each slot, the first rack 146 or the third rack 152. The reach and rake can then be adjusted which causes the slot to move relative to the clamp pin 134. The toothed wheels 140, 142 rotate around the clamp pin 134, causing different teeth on the wheels 140, 142 to move into gaps between teeth of the first rack 146 or third rack 152 and those teeth previously in engagement with the first rack 146 or the third rack 152 to move clear. The clamp pin 134 does not rotate during adjustment as the position of the clamp pin 134 is fixed by the lever 136 and clamp mechanism 120 in this example.

Figure 3:
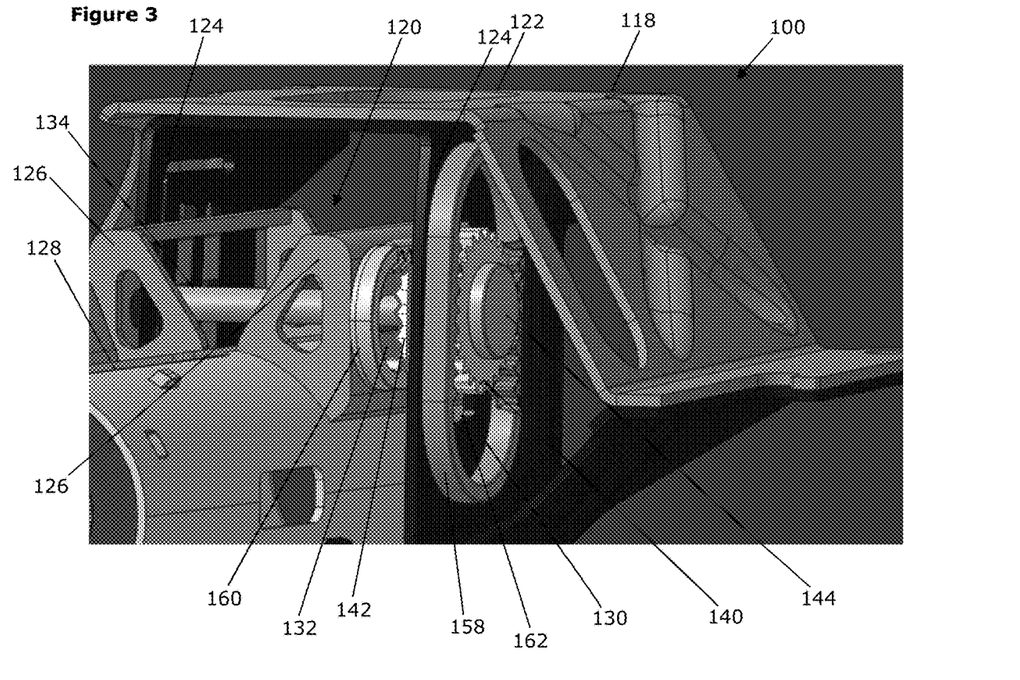
FIG. 3 is a perspective view of a part of the assembly of FIG. 1 showing in detail the clamp mechanism.

It can be seen, in particular in FIGS. 3 and 6, that secondary slots 162, 164 may be formed alongside the slots 130, 132 that engage the toothed wheels 140, 142. In the present embodiment, these secondary slots 162, 164 are narrower than the slots 130, 132 in order that they can provide a guide for the clamp pin 134. The secondary slots 162, 164 may also be the same or a similar size to the slots 130, 132.

In accordance with the provisions of the patent statutes, the principle and mode of operation of this invention have been explained and illustrated in its preferred embodiments. However, it must be understood that this invention may be practiced otherwise than as specifically explained.

What is claimed is:

1. An adjustable steering column assembly comprising:
   a steering column shaft that is connectable to a steering wheel of a vehicle and a steering rack,
   a shroud that protects and supports the steering column shaft comprising an upper portion and a lower portion, the upper portion being movable telescopically relative to the lower portion to permit a length of the steering column assembly to be varied,
   a mounting bracket through which the shroud is secured to a fixed part of the vehicle, and
   a clamp mechanism which secures the shroud to the mounting bracket, the clamp mechanism being operable between a released position in which at least one of a reach and rake of the steering column assembly may be adjusted and a clamped position in which the reach and rake of the steering column assembly are fixed, the clamp mechanism comprising:
      a first rack of teeth and a second rack of teeth that extend in parallel along opposing sides of a slot formed in a part of the shroud or the mounting bracket,
      a blocking device comprising at least one gearwheel, the blocking device having a set of radially projecting teeth spaced around at least part of a perimeter, at least one tooth of the blocking device being carried by the gearwheel and being engaged with the first rack of teeth when the clamp mechanism is in both the clamped position and the released position, and the blocking device being disengaged from the second rack of teeth when in the released position thereby allowing the gearwheel of the blocking device to roll along the first rack of teeth during adjustment of the steering column assembly, and at least one tooth of the blocking device engaging the second rack of teeth when the clamp mechanism is in the clamped position, the at least one gearwheel of the blocking device in the clamped position this condition being prevented from rolling along the first rack of teeth,
      tips of the teeth of the first rack of teeth each lying in a plane that is parallel relative to a direction of translational movement of the gearwheel when clamping or releasing, tips of the teeth of the second rack of teeth each lying in a plane that is inclined relative to the direction of translational movement of the gearwheel when clamping or releasing.

2. The adjustable steering column assembly according to claim 1, wherein the blocking device comprises two gearwheels, one gearwheel carrying the teeth that engage the first rack of teeth and the other gearwheel carrying the teeth that engage the second rack of teeth.

3. The adjustable steering column assembly according to claim 2, wherein the slot is carried by the shroud.

4. The adjustable steering column assembly according to claim 3, wherein the slot is carried by the shroud in a plate welded or riveted or otherwise fixed to the shroud.

5. The adjustable steering column assembly according to claim 2, wherein the slot extends in a direction that is substantially parallel to a major axis of the steering column shaft so that the clamp mechanism permits adjustment of the steering column assembly for reach.

6. The adjustable steering column assembly according to claim 2, wherein, in use, with the clamp mechanism released, the upper portion is configured to be collapsed or extended telescopically relative to the lower portion, causing the gearwheel to roll along the first rack of teeth on one side of the slot whilst being held clear of the second rack of teeth.

7. The adjustable steering column assembly according to claim 2, wherein the slot is carried by the mounting bracket.

8. The adjustable steering column assembly according to claim 7, wherein the slot is carried by the mounting bracket in a plate welded or riveted or otherwise fixed to the mounting bracket.

9. The adjustable steering column assembly according to claim 2, wherein the steering column assembly includes
   a third rack of teeth and a fourth rack of teeth that extend in parallel along opposing sides of a second slot formed in a part of the steering column shroud or the mounting bracket, the second slot being substantially orthogonal to the first slot,
   a second gearwheel having a set of radially projecting teeth spaced around at least part of a circumference of the second gearwheel, at least one tooth of the second gearwheel being permanently engaged with an adjacent pair of the teeth of the third rack of teeth when the clamp mechanism is in the released condition and when in the clamped condition, no teeth of the second gearwheel engaging the teeth of the fourth rack of teeth when the clamp mechanism is in the clamped position thereby allowing the second gearwheel to rotate about an axis thereof and roll along the first rack of teeth during adjustment of the steering column assembly, and at least one tooth of the second gearwheel contacting at least one tooth of the fourth rack of teeth when the clamp mechanism is in the clamped condition to prevent rotation of the second gearwheel and in turn prevent adjustment of the steering column shroud.

10. The adjustable steering column assembly according to claim 9, wherein the two gearwheels are carried by a common clamp pin.

11. The adjustable steering column assembly according to claim 2, wherein at least one of the two gearwheels is provided with teeth that have the same pitch as the teeth of the first rack of teeth and the teeth of the second rack of teeth.

12. The adjustable steering column assembly according to claim 2, wherein the mounting bracket comprises an upper part from which two arms depend, the shroud being located between the two arms, each arm including a guide slot through which the clamp pin of the clamp mechanism passes.

13. The adjustable steering column assembly according to claim 12, wherein the upper part is secured to the fixed part of the vehicle.

14. The adjustable steering column assembly according to claim 1, wherein the blocking device comprises only one gearwheel which carries the plurality of teeth.

15. The adjustable steering column assembly according to claim 14, wherein the gearwheel is supported by a clamp pin around which the gearwheel is free to rotate, the clamp pin extends through the mounting bracket and the shroud, and a portion of the clamp mechanism moves the gearwheel upon clamping in a direction parallel to the axis of the clamp pin toward and into engagement with the second rack of teeth and upon releasing in a direction away from and hence out of engagement with the second rack of teeth.

16. The adjustable steering column assembly according to claim 15, wherein movement is limited such that the teeth of the first rack of teeth always at least partially overlap and positively engage at least one tooth of the gearwheel at all times.

17. The adjustable steering column assembly according to claim 15, wherein the clamp mechanism includes a user operable handle or lever that enables the driver to operate the clamp mechanism by rotating the clamp pin.

18. The adjustable steering column assembly according to claim 15, wherein the slot is provided in a rail that extends from an upper surface of the upper portion, allowing the clamp pin to pass across a top of the upper portion clear of the steering column shaft.

19. The adjustable steering column assembly according to claim 15, wherein the clamp mechanism includes a cam assembly carried by the clamp pin that has a length that varies as the clamp pin rotates, and an actuator which is operable to rotate the clamp pin thereby to alter the length of the cam which in turn causes the clamp pin to move axially between the released and clamped positions.

20. The adjustable steering column assembly according to claim 14, wherein the first rack of teeth and second rack of teeth face inwardly towards each other across the slot.

\* \* \* \* \*